Figure 1:
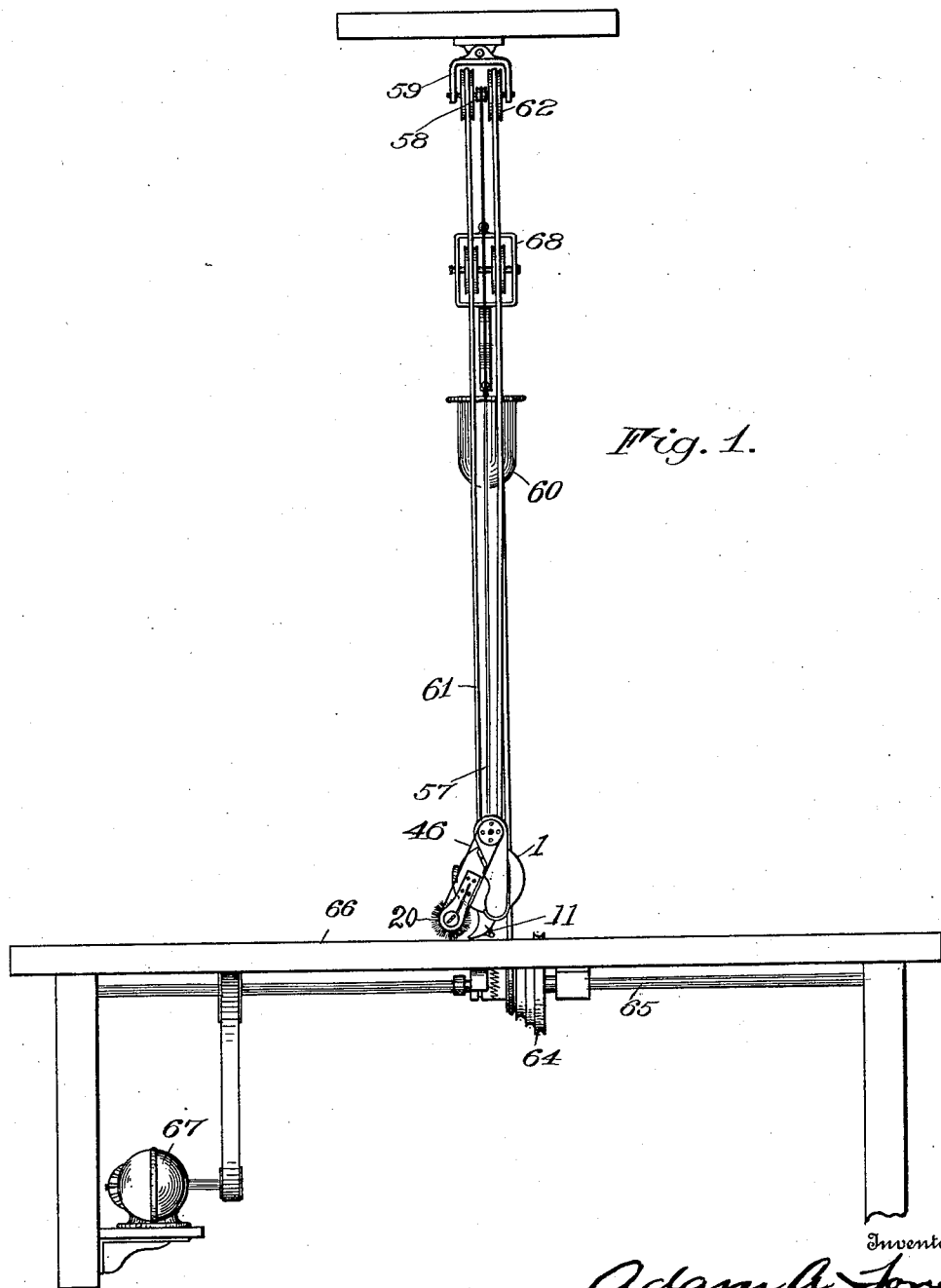

A. A. LONG.
CLEANING MACHINE.
APPLICATION FILED APR. 30, 1908. RENEWED MAY 16, 1911.

1,012,671.

Patented Dec. 26, 1911.
6 SHEETS—SHEET 1.

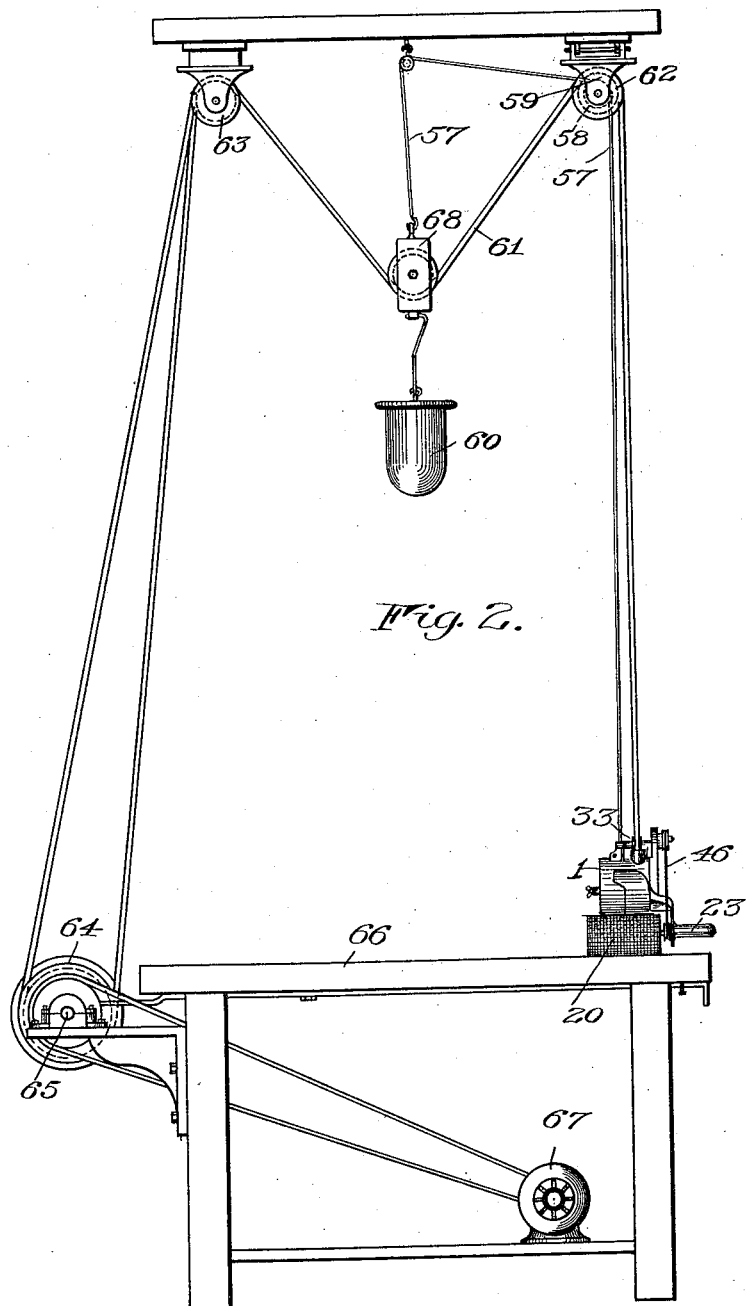

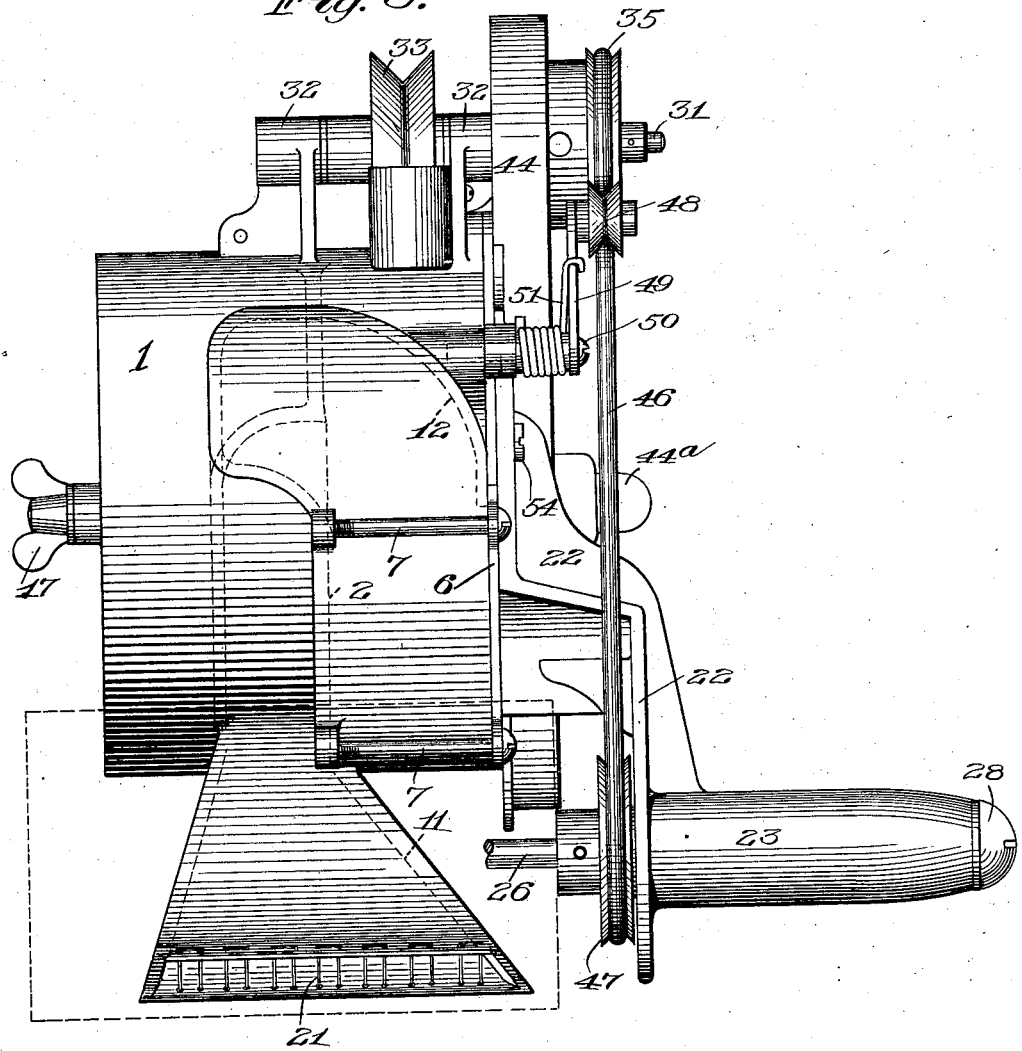

A. A. LONG.
CLEANING MACHINE.
APPLICATION FILED APR. 30, 1908. RENEWED MAY 16, 1911.
1,012,671.
Patented Dec. 26, 1911.
6 SHEETS—SHEET 4.
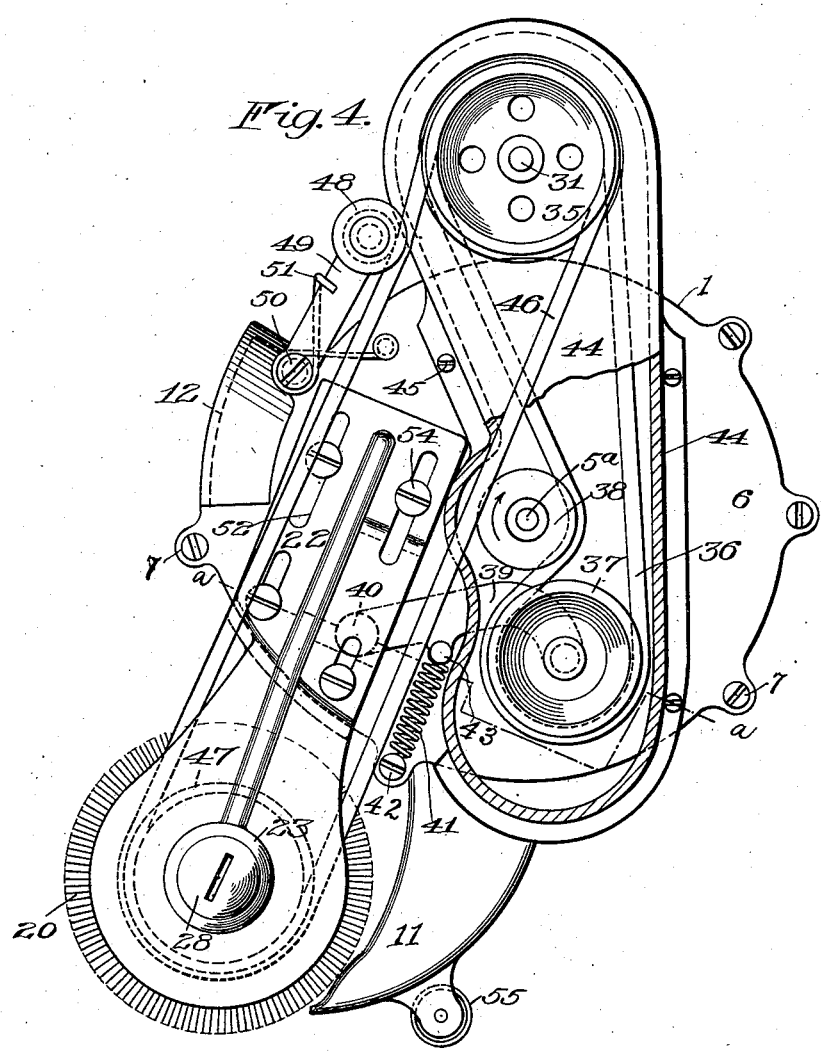
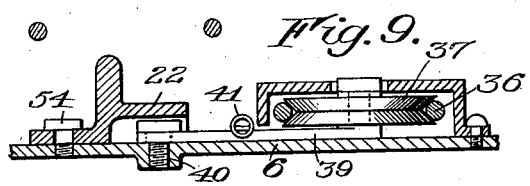

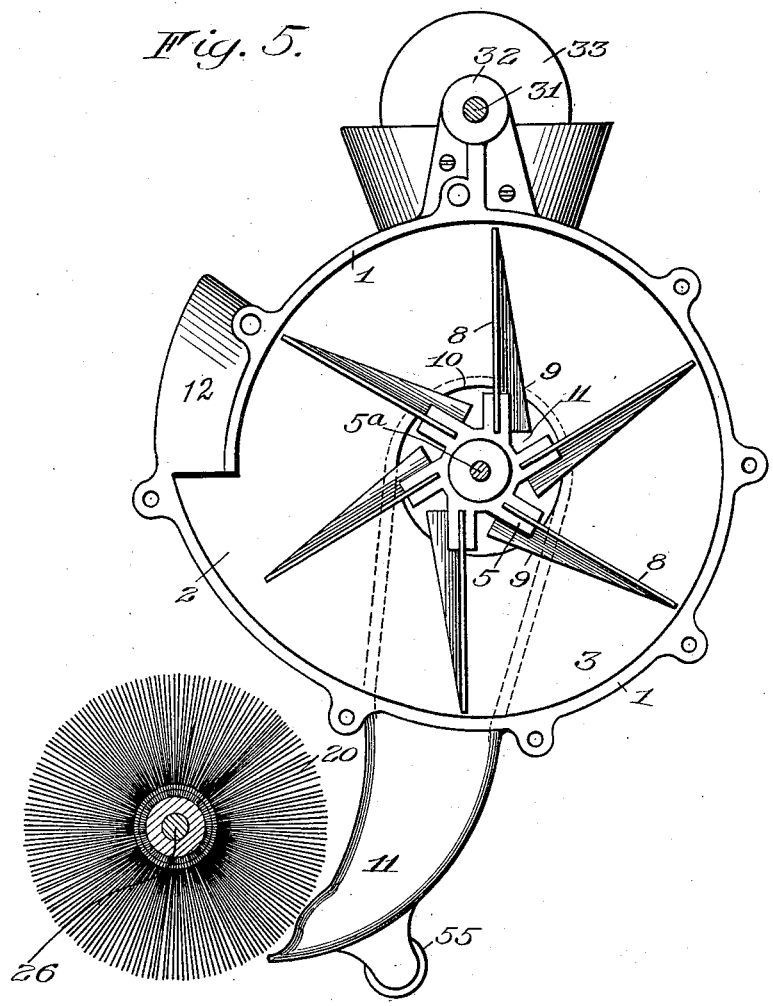

A. A. LONG.
CLEANING MACHINE.
APPLICATION FILED APR. 30, 1908. RENEWED MAY 16, 1911.
1,012,671.
Patented Dec. 26, 1911.
6 SHEETS—SHEET 6.
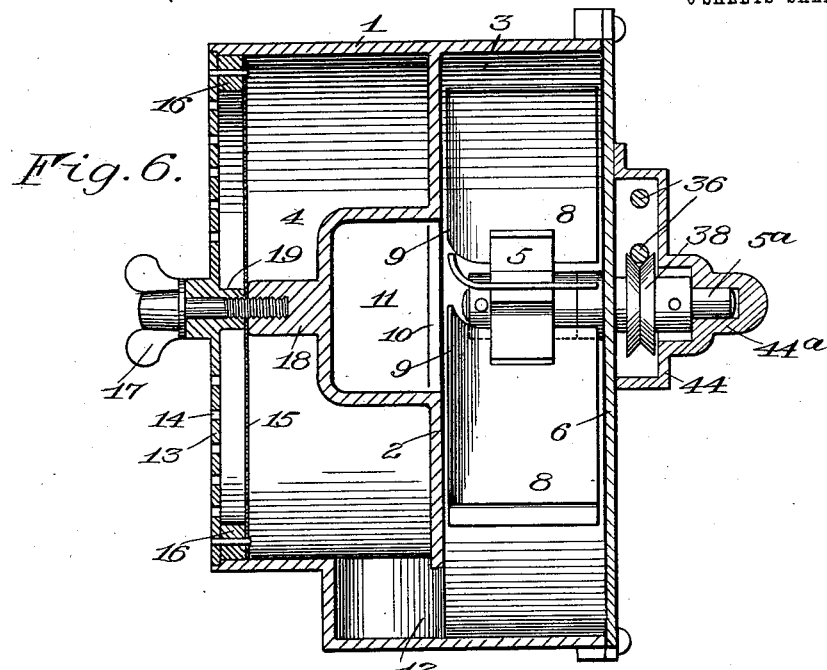
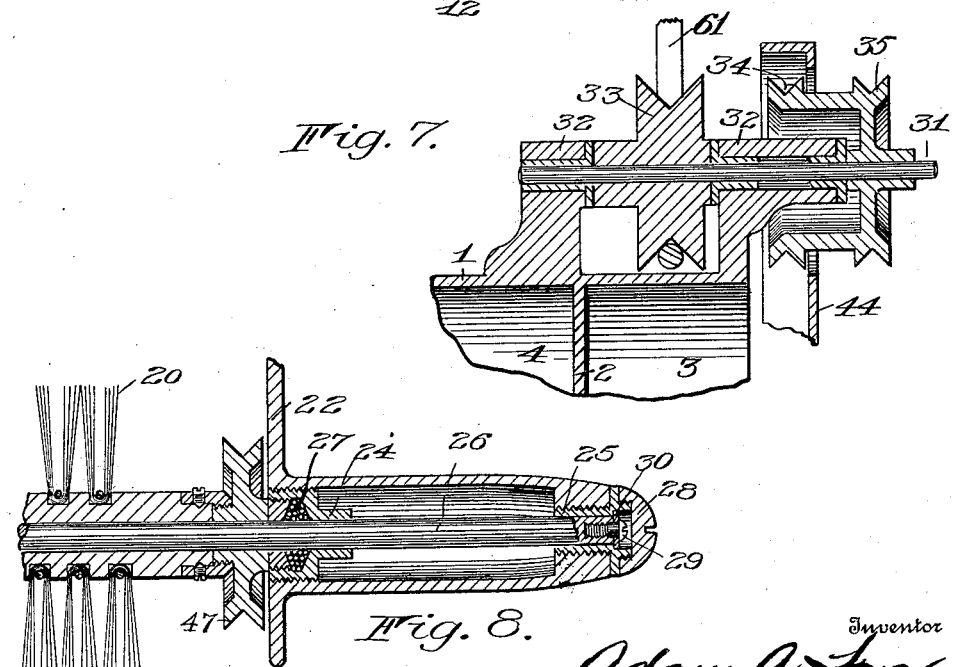

UNITED STATES PATENT OFFICE.

ADAM A. LONG, OF ROCHESTER, NEW YORK, ASSIGNOR TO THE TAILORS' ACCESSORIES CO., OF ROCHESTER, NEW YORK, A CORPORATION OF NEW YORK.

CLEANING-MACHINE.

1,012,671.     Specification of Letters Patent.     Patented Dec. 26, 1911.

Application filed April 30, 1908, Serial No. 430,043. Renewed May 16, 1911. Serial No. 627,515.

*To all whom it may concern:*

Be it known that I, ADAM A. LONG, of Rochester, in the county of Monroe and State of New York, have invented certain new and useful Improvements in Cleaning-Machines; and I do hereby declare the following to be a full, clear, and exact description of the same, reference being had to the accompanying drawings, forming a part of the specification, and to the reference-numerals marked thereon.

The present invention relates to cleaning machines and more particularly of the type in which a brush, or the like, is employed for agitating the dust or dirt and a suction device acts on the dirt and conducts it to a suitable receptacle.

It has for an object to provide a construction which will be effective for the purpose designed and will be light and portable and not expensive to manufacture.

To these and other ends the invention consists in certain improvements and combinations of parts all as will be hereinafter more fully described, the novel features being pointed out in the claims at the end of the specification.

In the drawings: Figure 1 is a front view of one embodiment of the machine with its preferred driving mechanism. Fig. 2 is a side view of the invention as shown in Fig. 1. Fig. 3 is a side view of one embodiment of the machine detached from its driving mechanism and having the brush removed. Fig. 4 is a front view of the machine with parts shown in section. Fig. 5 is a view showing the front wall of the casing removed. Fig. 6 is a horizontal section through the casing. Fig. 7 is a section in proximity to the machine carried drive shaft. Fig. 8 is a section showing the bearings for the brush shaft and the operating handle, and Fig. 9 is a section on line $a$—$a$ Fig. 4.

In the embodiment of the invention herein shown, I employ in connection with a brush or other agitating device, a dust collecting device which preferably comprises a casing 1 in this instance of cylindrical formation, divided by a transversely extending wall 2 into a suction chamber 3 and a dust or dirt chamber 4.

Arranged within the suction chamber is a fan 5 whose shaft $5^a$ is journaled only at one end in the end wall 6 of the casing, this wall being removably secured in place by bolts 7. The fan draws material through an inlet opening 10 in the wall 2 and is formed by a plurality of blades 8 arranged tangentially to the shaft $5^a$ and having their edges 9 in proximity to the opening curved, the curve of each blade gradually increasing toward the center of the fan. The inlet opening 10 communicates with an inlet passage 11 which extends radially therefrom within chamber 4 to the casing wall and then projects from the casing, being flared in one direction and contracted in the other in order to form a long and narrow intake at its outer end. The outlet, or discharge, from the suction chamber may be formed by providing an opening in the outer wall of the suction chamber and connecting said opening with an opening in the outer wall of the dust chamber 4 by means of an outlet passage 12 which is formed integrally with the casing 1.

The dust chamber is provided with an outlet for the air, and is formed to prevent the discharge of the dust. The air outlet is made by perforating the end wall 13 of the dust chamber at 14 and covering these perforations by a screen 15 of very fine mesh, this screen being arranged in spaced relation to the end wall in order that its entire surface may be used. Preferably the screen 15 is removable with the end wall or closure 13 in order to discharge the contents of the dust chamber and for this purpose the end wall carries a spacing ring 16 to which the screen is secured. The wall and the screen are held to the casing by a thumb screw 17 which passes centrally through the end wall and engages a stud 18 projecting from the wall of inlet passage 11, a stud 19 arranged centrally on the end wall 13 engaging the stud 18 and holding the screen against undue vibrations.

The driving of the fan may be effected in any suitable manner but it is preferred to journal a countershaft or drive shaft 31 on two bearing arms 32 formed integral with the casing. This countershaft carries between its bearing arms 32 a grooved pulley 33 which may be driven in a manner to be described. Also carried by the countershaft is a drum which forms two grooved pulleys 34 and 35 both of which are arranged on that side of the casing on which the suction chamber is provided. The pulley 34 has passed about it an endless belt 36 which also passes about a yieldingly supported pulley 37 after engaging the grooved pulley 38 mounted on the shaft 5ª of the fan and beyond the casing 1. The yielding support for pulley 37 is preferably in the form of an arm 39 pivoted to wall 6 at 40 on a screw and normally tending to move in a direction to maintain the belt taut, a coil spring 41 secured to the casing at 42 and to the arm at 43 producing this result. A casing 44 covers part of the driving mechanism and is removably secured by bolts 45 to plate 6. It also has a bearing 44ª for shaft 5ª.

The agitation of the dust is effected in proximity to the intake of the dust collecting device. In this instance a brush 20 is rotatably mounted so that its lowermost edge projects slightly below the lower edge of the intake which is curved to conform to the brush and has a suitable screening device, such as a wire 21, laced back and forth from opposite walls, to prevent the entrance of large particles or objects into the machine. The brush is preferably supported on an arm 22 which has a tubular laterally extending portion 23 serving as a handle to support the machine. The tubular portion 23 carries the bearings 24 and 25 for the shaft 26 of the brush, the bearing 24 being screwed into one end of the tubular portion and carrying a packing 27 to exclude dust from the bearing, while the bearing 25 is screwed into the other end and has a screw cap 28 closing it against dust. This screw cap when removed permits a screw 29 to be reached to remove the shaft, the screw holding a washer 30 against the bearing and preventing the withdrawal of the shaft.

The driving of the brush 20 is preferably effected by connecting it to pulley 35 on countershaft 31 by means of an endless belt 46, the belt being also passed about a pulley 47 which is arranged on shaft 26 between brush 20 and arm 22. An idler pulley 48 bears on the belt 46 to hold it taut and is supported by an arm 49 pivoted at 50 and pressed toward the belt by a spring 51.

So that the brush may be adjusted relatively to the intake, in order to vary the brushing action, I adjustably connect the arm 22 to the casing. In this instance the arm is provided with two parallel series of slots 52 in which work screws 54 thus permitting the brush to be raised and lowered.

As this invention is adapted to brush cloth, some means must be provided to prevent the cloth being carried to the intake, and for this purpose I provide a device in the form of a roller 55 arranged in a plane below the intake and adapted to travel on the cloth.

The machine may be supported and driven by the endless cable 61 preferably passing upwardly from pulley 33 on the machine over a pair of pulleys 62 having a common axis on a swinging frame 59, thence rearwardly over a pair of pulleys 63 also having a common axis and finally downwardly passing about one of the pulleys 64 on the shaft 65 that is mounted independently of the brushing machine, as, for instance, on the rear portion of the work support or table 66, the shaft being driven in any suitable manner as by an electric motor 67. The slack in the endless cable 61 is taken up by a suitable device which in this instance also acts to counter-balance the brushing machine and preferably comprises a sheave block 68 carrying a counter-weight 60. This sheave block, in order to prevent the counter-weight and the machine falling should the cable 61 break, has an independent connection with the brushing machine, such for instance as a cable 57 passing between its ends over a pulley 58 mounted on the swinging frame 59 between pulleys 62.

In operation, the work to be cleaned is placed upon the table 66 and the cleaning machine brought or lowered by means of handle 23 to the work located in any position on the table, the swinging pulley frame 59 permitting this action. The counterbalancing device holds the endless cable 57 taut and the cable causes the rotation of the shaft 31 to effect the driving of the fan 5 and also the driving of the brush.

A machine constructed in accordance with this invention is inexpensive to manufacture and simple in operation. When not in use it is held suspended out of the way of the work table, permitting the latter to be used for other purposes. The weight of the machine is very light and the counterbalancing device permits it to be operated with very little exertion on the part of the user. It is particularly adapted for use in tailoring establishments for cleaning clothes and cloth, as it may be moved easily to any position and when out of use permits the work support to be employed for cutting or other purposes.

I claim as my invention:

1. The combination with a brushing machine and an endless cable having the machine suspended therefrom, of a counterbalancing weight for the machine having connection with the latter independently of the cable to support the machine should the cable break.

2. The combination with a brushing machine, of an endless cable connected to the brushing machine to operate it, a weight for taking up slack on the endless cable and an independent connection between the weight and the machine for supporting said parts should the cable break.

3. The combination of a brushing machine embodying a brush, a suitable shaft on which the brush is mounted and a counter-shaft having driving connection with the brush shaft and mounted in rigid parallel relation thereto, with an endless cable connected to the counter-shaft and acting to suspend the brushing machine, and a device for taking up slack in the cable.

4. The combination of a brushing machine embodying a brush, a suitable shaft on which the brush is mounted and a counter-shaft having driving connection with the brush shaft and mounted in rigid parallel relation thereto, with an endless cable connected to the counter-shaft and acting to suspend the brushing machine, and a counter-balancing device for the brushing machine.

5. The combination with a brushing machine embodying a casing having an intake, a suction producing means connected with the intake and a brush operating to direct dirt to the intake, of an endless cable having the machine suspended thereby and driving the brush and suction producing means.

6. The combination with brushing machine, embodying a brush, a dust collecting device employing a fan, and a shaft having driving connection with the fan and the brush, of an endless cable connected to the shaft of the brushing machine, and a counterbalancing device for taking up slack in the endless cable.

7. The combination with a brushing machine embodying a brush, a dust collecting device employing a fan, and a shaft having driving connection with the fan and the brush, of an endless cable connected to the shaft of the brushing machine, a weight for taking up slack in the endless cable, and connection between the weight and the brushing machine for supporting said parts should the cable break.

8. The combination with a brushing machine, of a shaft mounted independently of the brushing machine, and having a pulley thereon, an endless cable passing about said pulley and also connected to the brushing machine to operate the latter, pulleys arranged in two pairs and having the endless cable passing thereover, and a counterbalancing device for the brushing machine, acting on the cable between the two pairs of pulleys.

9. The combination with a brushing machine, of an endless cable for driving the same, a shaft mounted independently of the brushing machine, and driving the endless cable, two pairs of pulleys over which the cable passes, a weighted sheave block acting on the cable between the two pairs of pulleys, and a connection between the sheave block and the brushing machine independent of the cable, capable of supporting the weight and the machine should the cable break.

10. The combination with a brushing machine, of an endless cable for driving and suspending the same, a shaft mounted independently of the brushing machine and driving the endless cable, two pairs of pulleys, one pair being arranged in rear of the other and each pair having a common axis, the cable being connected to the independently mounted shaft, passed over both pairs of pulleys and suspending the brushing machine from the front pair, and a weighted sheave block acting on both strands of the cable between the two pairs of pulleys.

11. The combination with a brushing machine, of an endless cable for driving and suspending the same, a shaft mounted independently of the brushing machine, two pairs of pulleys, each pair having a common axis and one pair being mounted in front of the other to swing about an axis transverse to their common axis, the cable being connected to the independently mounted shaft, passed over both pairs of pulleys and suspending the brushing machine from the front pair, and a weighted sheave block acting on both strands of the cable between the two pairs of pulleys.

12. The combination with a casing, of a transverse partition dividing it into two chambers having a central opening, a fan mounted in one chamber, an inlet conduit leading from the central opening through the other chamber and through the casing, a discharge conduit leading from the fan chamber to the other chamber, a perforated and removable end wall for the last named chamber, and means for rotating the fan to create a suction in the inlet.

13. In a brushing machine, the combination with a casing having an intake, and a tubular portion forming a handle, of a brush operating to direct dirt to the intake and having a shaft operating in the tubular portion.

14. The combination with a casing having a suction producing fan therein, and an intake, of an arm supported by said casing having a tubular portion forming a handle, and a brush having a shaft turning in the handle and operating in proximity to the intake.

15. The combination with a casing having a suction producing fan therein, and an intake, of an arm supported by said casing having a tubular portion forming a handle, a brush having a shaft turning in the handle and operating in proximity to the intake, and devices permitting said arm to be adjusted on the casing in order that the position of the brush may be changed.

16. The combination with a casing having a suction producing fan therein, and an intake, of an arm supported by said casing having a tubular portion forming a handle, a pair of bearing pieces each having screw threaded engagement with the handle, the inner one of said bearing pieces carrying a packing and the outer one being provided with a cap, and a brush having its shaft turning in both bearing pieces, and secured to the outer one.

17. The combination with a casing embodying a suction chamber having an intake and a dust chamber in communication with the suction chamber, having a removable closure, of a fan in the suction chamber, a brush operating without but in proximity to the intake, an arm supporting the brush from the casing, a countershaft on the casing, driving connection between the countershaft and the brush, and driving connection between the countershaft and the fan.

ADAM A. LONG.

Witnesses:
 HAROLD H. SIMMS,
 RUSSELL B. GRIFFITH.

Copies of this patent may be obtained for five cents each, by addressing the "Commissioner of Patents, Washington, D. C."